July 5, 1960

M. GOLDENBERG 2,943,964

TELEVISION VIEWING SCREEN

Filed June 17, 1958

Max Goldenberg
INVENTOR

United States Patent Office 2,943,964
Patented July 5, 1960

2,943,964

TELEVISION VIEWING SCREEN

Max Goldenberg, 1226 S. Linwood Ave., Evansville, Ind.

Filed June 17, 1958, Ser. No. 742,530

2 Claims. (Cl. 154—2.74)

This invention relates to electrons equipment, and more particularly, to a viewing screen for television receivers.

It is an object of the present invention to provide a television viewing screen for television picture tubes that will effectively reduce glare, reflection, and distortion from exterior objects, while simultaneously improving the clarity and quality of the viewed picture.

Another object of the present invention is to provide a television viewing screen of the type that will effectively prolong the useful life of the television picture tube through the consequential reduction of glare that will enable the television receiver to be operated at a substantially reduced contrast setting, thus reducing burn-out of the picture tube.

Other objects of the invention are to provide a television viewing screen bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which.

Figure 1:
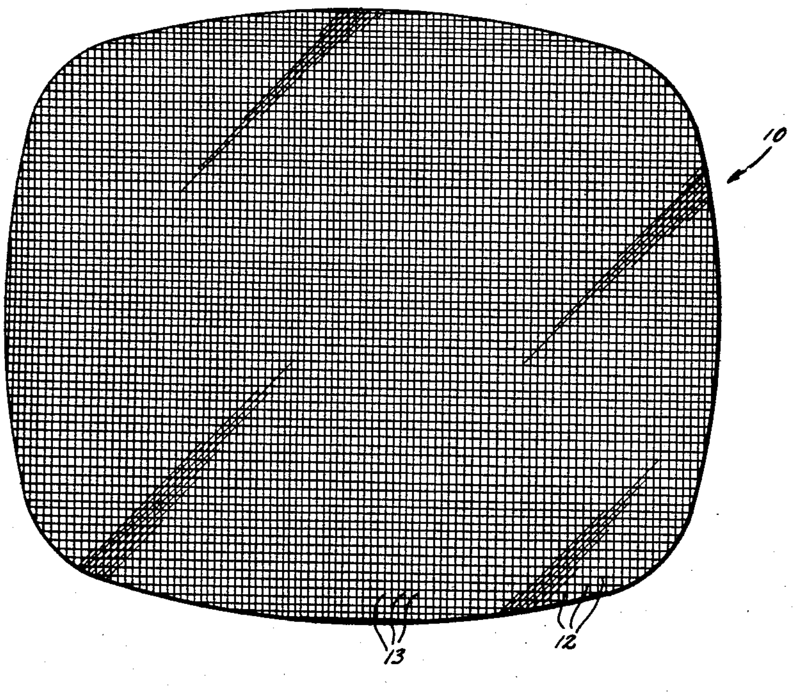
Figure 1 is a front elevational view of a television viewing screen made in accordance with one form of the present invention.
Figure 2:
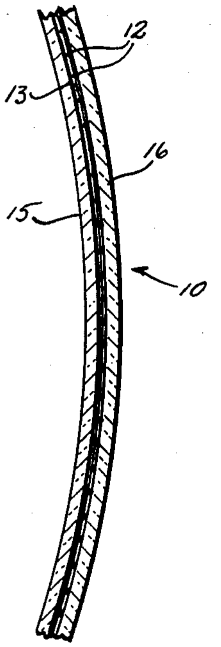
Figure 2 is an enlarged fragmentary cross sectional view of certain parts of the screen shown in Figure 1.

Referring now more in detail to the drawing, and more particularly to Figures 1 and 2 thereof, a viewing screen 10 for television picture tubes made in accordance with the present invention is shown to include a closely woven mesh of intersecting horizontal and vertical nylon threads 12, 13. These threads are preferably black opaque threads, but can also be of any opaque colored nylon threads, alternatingly arranged, such as in groups of blue, green, and red threads to provide an effect of color which will further enhance the viewing characteristics of the television receiver.

The horizontal threads 12 are equally spaced apart in parallel relationship with each other, as are the vertical threads 13. The horizontal and vertical threads also intersect at right angles and thus define small squares of substantially one sixty-fourth of an inch on each side. As a result, the threads are virtually invisible when the television receiver is viewed, while the thickness of the thin threads is sufficient to reduce the ambient light and glare from exterior objects, even when viewed in direct daylight and enabling the viewers to sit closer to the receiver at any angle of vision without uncomfortable eyestrain or reflected ambient light.

When the screen is of complex curvature, as illustrated in Figures 1 and 2 of the drawing, a three dimensional effect is also produced by the threads that reduces the flat look ordinarily found on most receivers so as to substantially increase the visibility and clarity of the received picture. Because of the increase in clarity and sharpness of the picture, it is possible to operate the receiver at a minimum contrast setting, thus reducing burnout and prolonging the useful life of the set.

The mesh is sandwiched between an inner sheet 15 and outer sheet 16 of clear plate glass of approximately one-eighth of an inch thick, such mesh being carefully positioned to prevent wrinkles and to maintain the horizontal and vertical threads in perpendicularly intersecting relationship to prevent any herringbone effect. Bonding means, of any suitable convention type are used to seal the two sheets of glass together. If desired, one or both of the sheets of glass may be tinted safety glass, of any desired hue to produce a desired effect. Since the curvature of the inner and outer sheet 15, 16 of glass are of substantially the same curvature as the glass screen of the television picture tube, it is placed or inserted in front of the picture tube of existing sets and thus further acts as a safety protection glass.

Figure 3:
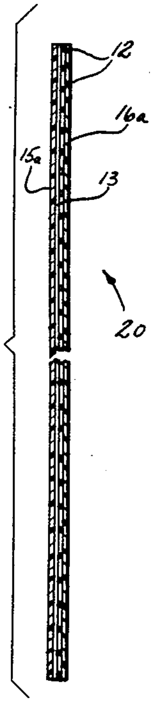
Figure 3 is a view similar to Figure 2, showing a substantially flat screen of similar construction.

In Figure 3 of the drawing, a similar viewing screen 20 is shown wherein the mesh material constructed of the intersecting horizontal vertical threads 12, 13 are sandwiched between a pair of substantially flat sheets *15a, 16a* of transparent glass, such flat screen being mountable in existing television receivers or incorporated in the manufacture of the television receiver cabinets. In both embodiments of the present invention, as has been hereinbefore described, the threads may be of any desired color, arranged in sets to produce the colored effect, as well as making the sheets of glass of any desired color to produce a tinted effect.

While various changes may be made in the detail construction, it shall be understood that such changes shall be within the spirit and scope of the present invention as defined by the appended claims.

What I claim as new and desire to protect by Letters Patent of the United States is:

1. A viewing screen for television picture tubes comprising means providing opaque thin thread-like lines intersecting with one another and running horizontally and vertically and defining small squares of the order of one sixty-fourth of an inch on each side, said thread-like lines being of a thickness almost invisible when the television picture is being displayed yet sufficient to reduce the ambient light and glare, transparent sheet means for supporting said thread-like means in a vertical plane.

2. A viewing screen for television picture tubes comprising a closely woven mesh of intersecting horizontal and vertical nylon opaque threads, said thread intersecting at right angles with one another and defining small squares of the order of one sixty-fourth of an inch on each side, said threads being of a thickness almost invisible when the television picture is being displayed, transparent sheets supporting said mesh therebetween and bonding means for securing the sheets together, said transparent glass having a complex curvature substantially corresponding to the curvature of the television screen.

References Cited in the file of this patent

UNITED STATES PATENTS

| | | |
|---|---|---|
| 1,268,145 | Pease | June 4, 1918 |
| 2,089,351 | English | Aug. 10, 1937 |
| 2,191,367 | Carothers | Feb. 20, 1940 |

FOREIGN PATENTS

| | | |
|---|---|---|
| 300,875 | Great Britain | Nov. 22, 1928 |